Patented Dec. 3, 1940

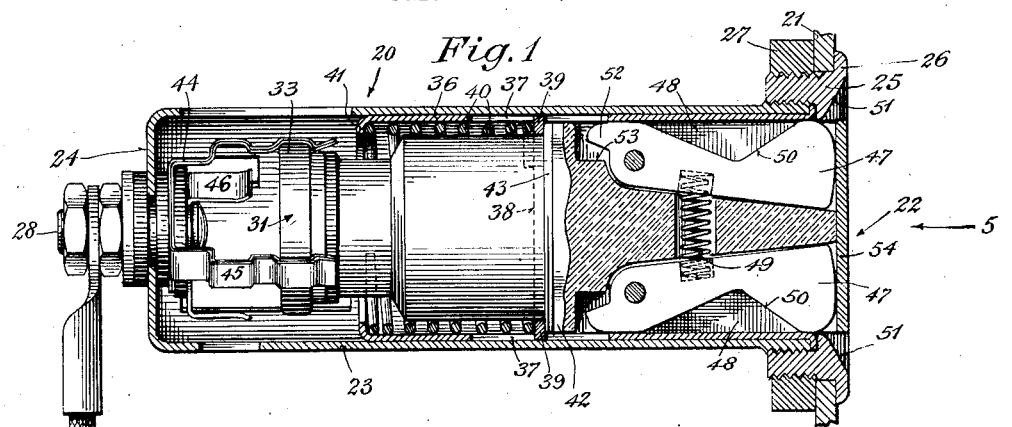

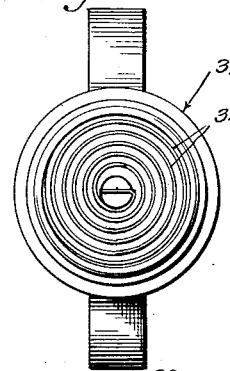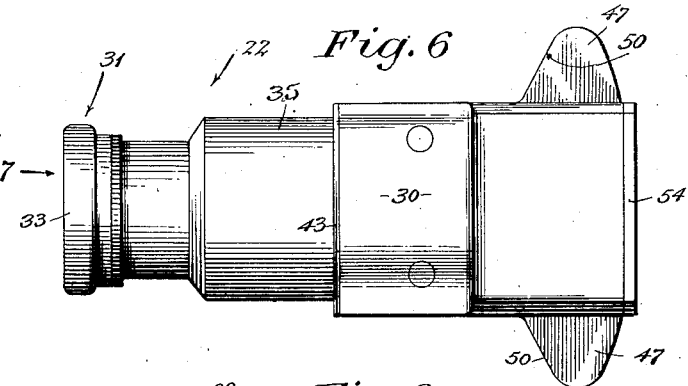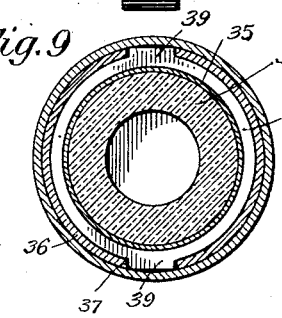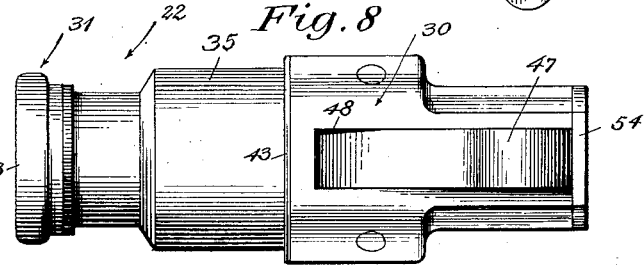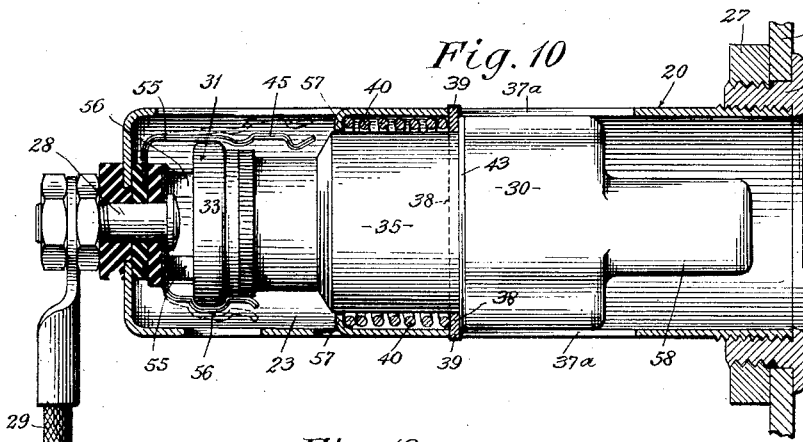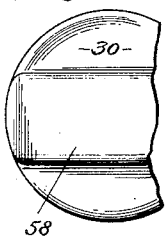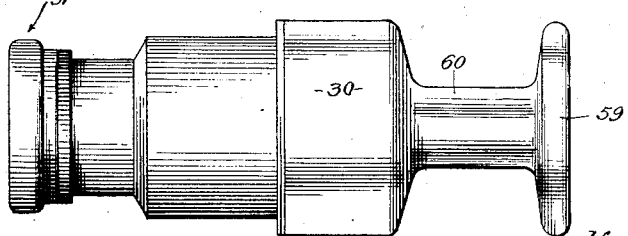

2,224,034

UNITED STATES PATENT OFFICE 2,224,034

CIGAR LIGHTER

Herbert G. Lehmann, Bridgeport, Conn., assignor to Automatic Devices Corporation, Bridgeport, Conn., a corporation of Connecticut Application June 30, 1937, Serial No. 151,124

16 Claims. (Cl. 219—32)

This invention relates to electric cigar lighters, and more particularly to cigar lighters of the well type wherein there is a holding device to be mounted on an instrument board, providing a well or recess in the board, and wherein there is a removable igniting unit in the form of a plug, carried in the recess.

Present day automobile travel has developed to the point where relatively high car speeds are commonplace, especially on the main highways between congested areas. Having in mind safety, car manufacturers have resorted to various arrangements for lessening the danger to the occupants if a car should become involved in a close situation. One of the measures employed is that of providing an instrument board which has no projecting parts, but which presents substantially a flat surface, to minimize injury if a person should be inadvertently thrown forward against the board because of a quick stop.

An object of the present invention is to provide an improved well-type cigar lighter which can be mounted on an automobile instrument board so that it will not normally protrude from the face thereof, yet so that it can be operated without difficulty, both to energize the lighter and remove the incandescent unit for use. This lighter is therefore particularly useful in cars having the new type instrument board which does not have protruding or projecting parts, and the lighter does not detract from the safety of such a board.

In the illustrated embodiments of the invention the lighter comprises a tubular holding device secured in an aperture in the instrument board to extend rearwardly therefrom, said holding device having a clamping flange engaging the front of the panel and lying flatly against same so as not to project therefrom any appreciable extent. A plug-like igniting unit is carried in the holding device so that the outer or front end of the unit is flush with the face of the clamping flange. Thus the unit does not project at all beyond the flange of the holding device. When it is desired to energize the lighter the front end of the igniting unit is pushed inwardly a small distance against a yielding means to an energizing position, and when the heating element on the igniting unit has reached the desired temperature the igniting unit will, upon release of the hand pressure, be urged by the yielding means to a protruding position, from which it can be readily removed for use.

In the embodiments of the invention shown, the action of the lighter is automatic, so that the unit, after being initially pressed inwardly to energizing position, will be automatically held in this position without further attention, and will be automatically moved to its protruded position when the heating element has reached the desired degree of incandescence. Also, the preferred embodiment has a novel knob or grip including a pair of movable wings which, when the igniting unit is in protruded position, extend laterally to provide a substantial grip by means of which the unit may be grasped for use.

Should it be desired to energize the unit again directly after it has been released from an initial energization, this can be accomplished by merely holding the unit in its deep energizing position until the desired heat is attained.

Other features and advantages will hereinafter appear.

In the accompanying drawings showing several embodiments of the invention:

Figure 1 is an axial section of the preferred form of lighter, showing the igniting unit in open-circuit storage position, the igniting unit being partially in elevation.

Fig. 2 is a similar view, but with the igniting unit depressed to energizing position.

Fig. 3 is a similar view, but showing the igniting unit released and moved to its protruded position.

Fig. 4 is a front elevation looking in the direction of the arrow in Fig. 3.

Fig. 5 is a front elevation looking in the direction of the arrow in Fig. 1, but with the front plate of the igniting unit removed.

Fig. 6 is a side elevation of the igniting unit per se.

Fig. 7 is a rear elevation of the igniting unit looking in the direction of the arrow in Fig. 6.

Fig. 8 is a top view of the igniting unit of Fig. 6.

Fig. 9 is a vertical section taken on the line 9—9 of Fig. 2.

Fig. 10 is an axial section of another embodiment of the invention, the igniting unit being shown in deep energized position.

Fig. 11 is a fragmentary front elevation of the knob of the igniting unit of Fig. 10; and Fig. 12 is a side elevation of an igniting unit having another form of knob.

In Figs. 1 to 3 the preferred form of lighter is shown, including a holding device 20 secured to an instrument panel 21 so as to project rearwardly therefrom, and carrying an igniting unit 22. The holding device 20 comprises a tubular metal shell 23 having an integral transverse rear wall 24, and having external threads at its open front end to screw into an internally threaded bushing 25 which has a panel-engaging flange 26 at the front thereof. The bushing 25 is externally threaded to carry a nut 27 by means of which it is secured to the panel 21.

The rear wall 24 of the shell is centrally apertured to carry a stud 28 insulated in the usual manner by washers as shown, said stud being connected with a wire 29 receiving current from a suitable source. The stud 28 constitutes one side of the circuit of the igniting unit 22, the other side comprising the shell 23 and grounded panel 21.

According to the present invention, the lighter is supported on the panel 21 so that no parts protrude which could injure a person who might be inadvertently thrown against the panel. It will be noted that the flange 26 of the clamping bushing 25 is relatively thin and lies flatly against the panel 21 so as to not perceptibly project therefrom. I have, moreover, provided that the igniting unit 22 be flush with the flange 26 when said unit is in open-circuit storage position, and further provided for energizing the unit by depressing it to a deeper position as in Fig. 2, and for automatically releasing the unit after a sufficient energization to a protruding position as in Fig. 3.

The igniting unit 22 as shown in the figures comprises a tubular body 30 adapted to fit within the shell 23, said body carrying at its rear end a heating element 31. The element 31 comprises a spiral coil 32 of resistance wire carried in a metal contact cup 33 and having its outer end connected to said cup and its inner end connected to a stud 34 which is in turn secured to a metal cap 35. The cup 33 is insulated from the stud 34 and cap 35 in the usual manner by washers, as shown, said cup functioning as a contact for the coil 32. The rear end of the igniting unit body 30 is of reduced outside diameter, and the cap 35 has corresponding small and large diameters to fit snugly over the body 30 with a press fit. For the purpose of yieldingly urging the igniting unit to protruded position as shown in Fig. 3, there is provided a metal cylinder 36 fitting within the shell 23, said cylinder having its front end outwardly turned to form a flange which is held between the bushing 25 and the end of the shell. The cylinder is provided with a pair of longitudinal slots 37 diametrically opposite each other to carry a ring 38 having tongues 39 extending into said slots, as shown in Fig. 9, said ring being urged forwardly by a helical compression spring 40 carried within the cylinder 36 and engaging an internal flange 41 at the end of the cylinder. The body 30 of the igniting unit is provided with an external shoulder 42 abutting a flange 43 on the cap 35, said flange being engaged by the ring 38 so that the igniting unit is continually urged forwardly by the spring 40. The slots 37 are so disposed that the spring 40 can project the igniting unit 22 beyond the face of the panel 21 so that it can be gripped by hand. Also, the slots are sufficiently long so that the igniting unit can be pressed inwardly an extent from the storage position of Fig. 1 to the closed-circuit position of Fig. 2.

There is provided by the invention a novel automatic detent and contact assembly carried by the stud 28 whereby the igniting unit is detained in either of the positions of Figs. 1 and 2 and, in response to heating of the element 31, is released so that the spring 40 will urge it outwardly of the holder to protrude as in Fig. 3. This assembly includes a bimetallic spring detent clip 44 having arms 45 shaped as shown to engage the metal cup 33 and detain the igniting unit in either open-circuit or closed-circuit position. The clip 44 is carried by the stud 28 but insulated therefrom by washers as shown in Fig. 2 so that said clip functions purely as a detent and does not have electrical significance.

For the purpose of making electrical connection to the heating element when the igniting unit is in the position of Fig. 2 the stud 28 carries a second clip 46 of resilient metal which clip engages the rim of the cup 33. This clip is secured under the head of the stud 28 and is electrically connected to the same. When the igniting unit is in the position of Fig. 1, the clip 46 is not engaging the cup 33 and therefore the circuit through the heating element is open. The igniting unit is held in this storage position against the urging of the spring 40 by the detent clip 45 engaging the cup. When the igniting unit is depressed as in Fig. 2, the clip 46 will electrically engage the cup 33 and the circuit through the element will be completed. Current will flow through the wire 29, stud 28, clip 46, cup 33, coil 32, stud 34, cap 35, spring 40, cylinder 36 and through the panel 21 to the ground. As the coil 32 reaches the desired incandescence it will flex the arms of the clip 44 outwardly, as shown in Fig. 3, resulting in release of the igniting unit which will be protruded by the spring 40, ready for use.

I have also provided an improved knob assembly and the front end of the igniting unit to facilitate grasping same by hand, this assembly including a pair of wings 47 pivotally carried in slots 48 so as to be retractable therein when the igniting unit is entirely within the shell 23, and so as to extend laterally from the unit when in the projected position of Fig. 2. The wings 47 are urged apart by a helical compression spring 49, the ends of which are positioned in recesses in said wings. Preferably the wings 47 have camming edges 50 adapted to engage a conical cam face 51 on the bushing 25 so that when the igniting unit is placed in the shell 23 the wings will be automatically depressed as the unit continues its inward movement. Also, these engaging camming surfaces serve to aid and complete the ejecting movement of the lighter, since the spring 49 in urging the wings apart causes these in turn to urge the unit forwardly.

For the purpose of limiting the laterally projecting movement of the wings 47 these are provided with tabs 52 engaging shoulders 53 in the slots 48. The front end of the igniting unit is capped with an oval plate 54 secured in place by screws, as shown in Fig. 4.

Another embodiment of the invention is shown in Figs. 10 and 11, the operation of this being similar to that of the preferred embodiment just described, except that the knob of the igniting unit does not have movable wings, and except that the detent and contact clip assembly carried by the shell is different in its operation, also it will be noted that the spring and ring for yieldingly urging the igniting unit outwardly are carried directly by the shell of the holder, instead of through the intermediary of a separate cylinder.

Referring to Fig. 10, the stud 28 insulatedly carries a bimetallic clip 55 which is adapted to hold the igniting unit only in open-circuit storage position. These arms are insulated from the stud. A second bimetallic clip 56 is carried under the head of the stud 28 and electrically connected therewith, said clip being adapted to engage the cup 33 of the heating element only when the igniting unit is in the closed-circuit position, as in Fig. 10, and said clip being adapted to detain the unit in this position against the action of the coil spring 40.

The circuit is completed through the wire 29, stud 28, clip 56, to the cup 33 and through the heating coil and igniting unit as already described. When the coil becomes sufficiently hot it will cause the clips 55 and 56 to flex outwardly as shown in dotted lines and release the igniting unit so that the latter will move to projected position in response to the urging of the spring 40.

It will be noted that the spring 40 is carried directly inside the shell 23 which has inturned fingers 57 engaging one end of the spring, and has longitudinal slots 37a carrying the ring 38 engaging the other end of the spring.

The knob 58 of the igniting unit is shown as being flat so that it may be grasped readily and passed from one person to another without difficulty.

A modified form of knob is shown in Fig. 12 this knob constituting a circular button-like plate 59 secured to a long neck 60 on the igniting unit body.

As just described the lighter is automatic in operation, that is, the igniting unit is automatically held in closed-circuit position and released therefrom to be protruded in response to heating of the element 31. However, the lighter also has utility when used without the automatic feature. For such use, referring to Figs. 1 and 2, the arms 45 of the bimetallic clip 44 will be provided with a single detent at their foremost ends to hold the igniting unit in storage position against the action of the spring 40. In other words, the clip 55 of the lighter of Fig. 10 may be substituted for the clip 44. The igniting unit may be depressed to the position of Fig. 2 for completing the circuit, but if the clip is substituted, as suggested, the unit must be manually held in this position, since the contact clip 46 will serve this purpose. When the heating element becomes sufficiently hot the arms of the bimetallic clip will flex outwardly, as with the automatic arrangement, to release the igniting unit so that when manual pressure is removed therefrom it will protrude from the holder. When operating a lighter according to this non-automatic arrangement the user can determine when the heating element is ready for use by releasing the pressure on the igniting unit. If the latter projects as in Fig. 3 it is ready for use; if it merely moves to the position of Fig. 1 the heating element is not hot enough and must be further heated.

Variations and modifications may be made within the scope of this invention and portions of the improvements may be used without others.

I claim:

1. A cigar lighter having a hollow holding device; a plug-like igniting unit supported on the holding device for quick removal and replacement incident to its use; means for holding the igniting unit in stored position in the holding device so as to be normally nonprojecting therefrom; a heating element carried by the igniting unit; means for energizing the heating element upon movement of the igniting unit from said stored position; means for holding the igniting unit in energizing position and releasing when the heating element has attained incandescence; and means rendered operative at the time the heating element is brought to incandescence to project the igniting unit from energizing position and beyond the storage position and end of the holding device so that it may be grasped by the user and removed for use.

2. A cigar lighter having a hollow holding device; a plug-like igniting unit supported on the holding device for quick removal and replacement incident to its use; means for maintaining the igniting unit in a stored position in the holding device so as to be normally nonprojecting therefrom; a heating element carried by the igniting unit; means for energizing the heating element; means, including a thermally responsive catch, for holding the igniting unit in energizing position and releasing it upon attaining the desired heat; and ejecting means for the igniting unit, rendered operative upon the heating element on the igniting unit becoming heated sufficiently for use to project the igniting unit beyond the holding device so that it may be grasped by the user and removed for use.

3. A cigar lighter having a hollow holding device having means for mounting it on the instrument board of a motor vehicle with its entrance opening substantially flush with the instrument board; a plug-like igniting unit supported on the holding device for quick removal and replacement incident to its use; yielding means retaining said igniting unit in a stored position in the holding device so as to be normally nonprojecting therefrom; means for urging the igniting unit to a partially projected position on the holding device, a heating element carried by the igniting unit; means for energizing the heating element; and means rendered operative upon the heating element on the igniting unit becoming heated sufficiently for use to release said igniting unit to project the igniting unit for movement through the storage position by the urging means and beyond the end of the holding device and the plane of the instrument board so that it may be grasped by the user and removed for use.

4. A cigar lighter having a hollow holding device, a plug-like igniting unit supported on the holding device for quick removal and replacement incident to its use; means tending to project the igniting unit partially from the holding device in which position it can be gripped for use; means releasably holding the igniting unit on the holding device in an intermediate or storage position with the igniting unit non-projecting therefrom; temperature responsive means for holding the igniting unit in a position beyond the intermediate position and for releasing said igniting unit upon the heating element attaining the desired heat, and means for closing a circuit to the heating element in said last named position.

5. The cigar lighter as defined in claim 4 wherein the means for holding the igniting unit in storage position is inoperative to retain said igniting unit in said position when released by said temperature responsive means.

6. A cigar lighter having a tubular holding device; a plug-like igniting unit supported on the holding device for quick removal and replacement incident to its use and adapted to be stored in the holding device so as to be normally nonprojecting therefrom; and means for partially ejecting the igniting unit beyond the holding device so that it may be grasped by the user and removed for use, said ejected portion of the igniting unit having retractable finger-grip extensions movable into operative position at the time the igniting unit is so ejected.

7. A cigar lighter having a tubular holding device; a plug-like igniting unit supported on the holding device for quick removal and replacement incident to its use, means for retaining the igniting unit in a stored position in the holding device so as to be normally nonprojecting therefrom; means for holding the igniting unit in and releasing it from an energizing position, and means for partially ejecting the igniting unit through the stored, non-projecting position to dispose a portion beyond the holding device so that it may be grasped by the user and removed for use, said ejected portion of the igniting unit having flat finger-grip portions being accessible for engagement while the igniting unit is so ejected.

8. A cigar lighter having a tubular holding device; a plug-like igniting unit supported on the holding device for quick removal and replacement incident to its use and adapted to be stored in the holding device so as to be normally nonprojecting therefrom; means for partially ejecting the igniting unit beyond the holding device so that it may be grasped by the user and removed for use, said ejected portion of the igniting unit having flat finger-grip portions disposed for movement about an axis at right angles to the axis of the igniting unit; and means for moving said portions automatically upon ejection of the igniting unit to make them accessible for gripping when the igniting unit is so ejected.

9. A cigar lighter having a tubular holding device; a plug-like igniting unit supported on the holding device for quick removal and replacement incident to its use; means for retaining the igniting unit in a stored position in the holding device so as to be normally nonprojecting therefrom; means for holding the igniting unit in and releasing it from an energizing position; and means for partially ejecting the igniting unit through the stored, non-projecting position to dispose a portion beyond the holding device so that it may be grasped by the user and removed for use, said ejected portion of the igniting unit having flat finger-grip portions disposed parallel to the axis of the igniting unit being accessible for engagement when the igniting unit is so ejected.

10. A cigar lighter having a hollow holding device; a plug-like igniting unit supported on the holding device for quick removal and replacement incident to its use; a heating element carried by the igniting unit; means for energizing the heating element; means tending to eject the igniting unit partially from the holding device; means for retaining the igniting unit in stored open-circuit position against the action of said ejecting means, said means being yieldable to permit the igniting unit to be moved on the holding device to closed-circuit position; means for retaining the igniting unit in closed-circuit position; and means responsive to the temperature of the heating element for making both of said retaining means inoperative.

11. A cigar lighter having a hollow holding device; a plug-like igniting unit supported on the holding device for quick removal and replacement incident to its use and adapted to be stored in the holding device so as to be normally nonprojecting therefrom; a heating element carried by the igniting unit; means for energizing the heating element; means for retaining the igniting unit in stored open-circuit position, said means being yieldable to permit the igniting unit to be moved on the holding device to closed-circuit position; means for retaining the igniting unit in said closed-circuit position; means responsive to the temperature of the heating element for making said retaining means inoperative; and means for ejecting the igniting unit partially from the holding device when both of said retaining means are inoperative so that the projecting portion may be grasped by the user and the igniting unit thereby removed for use.

12. A cigar lighter having a hollow holding device; a plug-like igniting unit supported on the holding device for quick removal and replacement incident to its use and adapted to be stored in the holding device so as to be normally nonprojecting therefrom; a heating element carried by the igniting unit; means for energizing the heating element; means for retaining the igniting unit in stored open-circuit position, said means being yieldable to permit the igniting unit to be moved farther into the holding device to closed-circuit position; means for retaining the igniting unit in closed-circuit position; means responsive to the temperature of the heating element for making both said retaining means inoperative; and means for ejecting the igniting unit partially from the holding device so that the projecting portion may be grasped by the user and the igniting unit thereby removed for use.

13. A cigar lighter having a hollow holding device; a plug-like igniting unit supported on the holding device for quick removal and replacement incident to its use and adapted to be stored in the holding device so as to be normally nonprojecting therefrom; a heating element carried by the igniting unit; cooperating contacts on the igniting unit and on the holder adapted to engage and energize the heating element when the igniting unit is moved to closed-circuit position on the holding device; means tending to eject the igniting unit partially from the holding device; and bimetallic means for retaining the igniting unit in stored open-circuit position against the action of said ejecting means and for retaining the igniting unit in closed-circuit position with said cooperating contacts engaging against the action of said ejecting means, said bimetallic means being in thermal relation to the heating element and being rendered inoperative thereby when the heating element has been brought to desired temperature for use and thereby free the igniting unit for partial ejection by said ejection means so that the igniting unit may be grasped and removed from the holder for use.

14. A cigar lighter having a hollow holding device; a plug-like igniting unit supporting on the holding device for quick removal and replacement incident to its use; a heating element carried by the igniting unit; cooperating contacts on the igniting unit and on the holder adapted to engage and energize the heating element when the igniting unit is moved to closed-circuit position on the holding device; means tending to eject the igniting unit partially from the holding device; and bimetallic means for retaining the igniting unit in stored open-circuit position against the action of said ejecting means and for retaining the igniting unit in closed-circuit position with said cooperating contacts engaging against the action of said ejecting means, said bimetallic means being in thermal relation to the heating element and being rendered inoperative thereby when the heating element has been brought to desired temperature for use and thereby free the igniting unit for partial ejection by said ejection means whereupon the igniting unit may be grasped and removed from the holder for use.

15. A cigar lighter having a hollow holding device; a plug-like igniting unit supported on the holding device for quick removal and replacement incident to its use, said igniting unit having at one end a finger piece and said finger piece comprising a plurality of wings pivotally mounted on the igniting unit and spring urged to operative position, said wings constituting auxiliary finger grips for the igniting unit collapsible to an out of the way position in the igniting unit, the collapsed position of the wings permitting the igniting unit to be moved into the holding device.

16. In a cigar lighter, a holding device; an igniting unit supported by the holding device to be movable thereon in reverse directions so that its continued movement in one of said directions results in projecting of, and finally complete removal of, the unit from the holder, and its movement in the other of said directions terminates in a deep position on the holder; a heating element carried by the igniting unit; means for yieldingly detaining the igniting unit in a second nonprotruding position on the holder, advanced of said deep position; means for completing a circuit through the heating element when the igniting unit is moved from said second position to the deep position; and means for automatically moving the igniting unit to a projecting position on the holder in advance of said second position upon the heating element reaching a desired usable heat.

HERBERT G. LEHMANN.